Nov. 29, 1966   S. A. BRESLER   3,288,557
REMOVAL OF ACID GASES FROM GAS STREAMS
Filed July 26, 1962
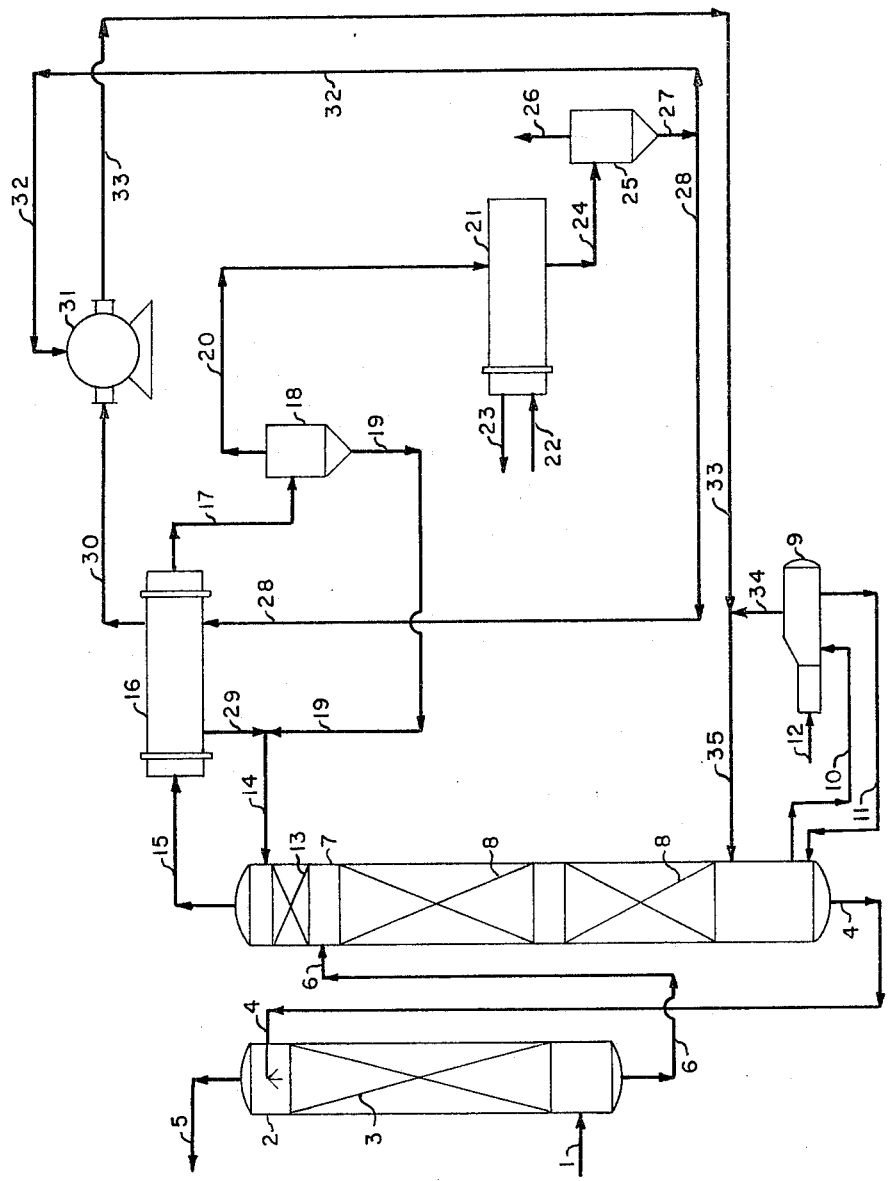
SIDNEY A. BRESLER
*INVENTOR.*
BY J. T. Chabooty
*AGENT*

3,288,557
REMOVAL OF ACID GASES FOR GAS STREAMS

Sidney A. Bresler, New York, N.Y., assignor to Chemical Construction Corporation, New York, N.Y., a corporation of Delaware
Filed July 26, 1962, Ser. No. 212,677
3 Claims. (Cl. 23—2)

This invention relates to the removal of acid gases from gas streams. A method of heat recovery has been developed, which utilizes vapor compression in a novel manner to recover usable heat from the mixed vapor stream produced in the regeneration of aqueous alkaline scrub solutions.

The removal of weakly acidic gases such as carbon dioxide and hydrogen sulfide from mixed gas streams such as synthesis gas or natural gas is commonly accomplished by scrubbing the gas stream with an aqueous solution of an alkaline absorbent. Typical absorbents consist of aqueous solutions of potassium carbonate or monoethanolamine (MEA). The scrubbing solution containing dissolved acid gas component is regenerated by heating in a distillation column. Steam or process gases may be used to heat the liquid at the base of the column. This heat may be supplied indirectly, by means of a reboiler, or directly by the introduction of steam into the column. The heated liquid, largely freed of absorbed acidic gases, leaves the bottom of the column and is recycled for further gas scrubbing.

The vapors leaving the top of the column consist primarily of desorbed acidic gases and water vapor. Normally these vapors are cooled until most of the water vapor has been condensed. Cooling is usually effected by the use of cooling water or by heat exchange in which the sensible heat of fluids used elsewhere in the plant is increased. When the alkaline absorbing materials has a relatively high vapor pressure at the top of the distillation column, as in the cases of MEA, its concentration in the condensed vapor is high. In this case the condensate must be returned to the distillation column or elsewhere to the circulating solution. When the alkaline absorbing material has a relatively low vapor pressure at the top of the distillation column, as in the case of potassium carbonate, a portion of the condensate may be returned to the circulating system and the rest of the condensate discarded or used elsewhere.

It will be evident that most of the heat supplied to the base of the distillation column, except for the difference in sensible heats of the entering and leaving liquids, the heats of desorption and vaporization of the acid gases, and thermal losses to the atmosphere from the insulated column, will appear in the vapor stream leaving the top of the column. As mentioned supra, substantially none of this heat is recovered or utilized. Prior recovery of this heat, such as in the preheating of boiler feedwater, has recovered energy only in the form of sensible heat. Since such heat requirements are not large, the amount of heat which could be recovered has been limited.

In the present invention, a significant portion of the heat in the overhead vapors leaving the top of the distillation column is recovered, by utilizing this heat to vaporize water or other fluid such as ammonia or Dowtherm in a heat exchange step. The vaporized fluid is then compressed as required, in order to raise its condensing temperature to a level suitable for heat exchange usage. The compressed vapor is then utilized for process heating, preferably to reduce the external heat requirements of the distillation. In the heat exchange step, the vapors leaving the top of the distillation column are only partially condensed.

A primary advantage of the present invention is that previously wasted heat is recovered in usuable form at low cost, the principal operating cost being power cost for running the vapor compression. Another advantage of the present invention is that the process heat requirement of the regenerative distillation step is substantially reduced, when the compressed vapor is recycled and used for process heating in the distillation step. Finally, the cooling water requirement for condensation of overhead vapors from the distillation step is significantly reduced.

It is an object of the present invention to regenerate aqueous alkaline absorbent solutions containing dissolved acid gases in an improved manner.

Another object is to recover usable heat from the vapor stream generated in the regenerative distillation of these solutions.

A further object is to reduce the overall process heating requirements in the regenerative distillation of these solutions.

An additional object is to reduce the cooling water requirements for condensation of overhead vapors produced in the regenerative distillation of these solutions.

Still another object is to utilize the vapor compression concept in recovering heat by partial condensation of overhead vapors produced in the regenerative distillation of these solutions.

These and other objects and advantages of the present invention will become evident from the description which follows. Referring to the figure, a preferred embodiment of the heat recovery method of the invention is presented, as applied to the recovery of heat from the off-gas stream produced when a stream of MEA laden with absorbed acid gas is regenerated. In the figure, both absorption and regeneration stages are shown. Thus, a stream 1 consisting of synthesis gas or other gas stream containing an acidic gas component such as carbon dioxide, is passed into the lower part of scrubber 2, which is provided with packed section 3 or other means for gas-filled contact. A regenerated scrubbing solution 4, in this case an aqueous MEA solution, is passed into the top of unit 2 above section 3. The rising gas stream is scrubbed by the downflowing liquid solution in section 3, and the acidic gas component is absorbed into the liquid phase. The residual gas stream, now substantially free of acidic gas component, is removed from unit 2 via 5.

The absorbent solution, now laden with absorbed acid gas component, is recovered from unit 2 via 6 and is passed into the upper part of regenerator 7. Unit 7 is provided with packed sections such as 8 or other means for gas-liquid contact. The liquid stream passes downward through unit 7 counter-current to a rising stream of heating steam, and is regenerated, with the acid gas component being vaporized into the steam phase. The regenerated liquid solution is removed from the bottom of unit 7 via 4 and recycled to the absorption step. Unit 7 is typically provided with lower heating means such as reboiler 9. A stream of liquid solution is circulated from unit 7 to reboiler 9 via 10, and is heated and returned to 7 via 11. Heating steam, or other heating fluid, is passed into reboiler 9 via 12. A portion of stream 10 is vaporized in reboiler 9. The resulting vapor stream is removed from unit 9 via 34.

Typical operating conditions in unit 7 will consist of substantially atmospheric pressure and temperatures in the range of 200° F. to 250° F. Typical operating conditions in unit 2 will consist of substantially atmospheric or superatmospheric pressure, approximating that existing in line 1, and temperatures in the range of 80° F. to 250° F. When solution 4 consist of MEA, lower temperatures in the range of 80° F. to 130° F. will prevail in unit 2. Heat exchange between streams 4 and 6, not shown, usually will be provided. When absorber unit 2 is maintained at an elevated pressure, a pressure reducing valve will be provided in line 6, and line 4 will be provided with a solution recycle pump, not shown.

The rising mixed stream of desorbed acid gas and steam passes upward from packed sections 8, and is scrubbed in upper section 13 by liquid condensate water stream 14. This serves to remove almost all of the vaporized MEA from the rising stream. The mixed gas stream now leaves unit 7 via 15, at a temperature typically in the range of 210° F. to 230° F., and passes into partial condenser 16. Here the stream is cooled by heat exchange to a temperature in the range of 200° F. to 210° F., and a portion of the steam content is condensed. The resulting mixed gas-liquid stream leaves unit 16 via 17, and passes to condensate separator 18. Liquid water condensate is withdrawn from unit 18 via 19, while the gase phase consisting of uncondensed steam and acid gas is removed via 20, and passed to total condenser 21 in which substantially all of the remaining steam is condensed. Cooling water is circulated into unit 21 via 22 and withdrawn via 23. The resulting final gas-liquid mixture, now at a temperature typically in the range of 80° F. to 120° F., is withdrawn from unit 21 via 24 and passes into final condensate separator 25. The residual stream of acid gas together with a minor proportion of water vapor is discharged via 26, while the final condensate stream is removed from unit 25 via 27.

Condensate stream 27 is now split, with one portion passing via 28 to vaporization in partial condenser 16. Most of stream 28 is vaporized in unit 16, except for a residual liquid blowdown stream 29. Stream 29 is required in order to prevent a buildup in unit 16 of the small MEA content which is present in stream 28. Stream 29 is combined with condensate stream 19, and the combined liquid stream is passed via 14 to unit 7 as described supra.

The vaporized portion of stream 28 is withdrawn via 30 as steam at a temperature typically in the range of 195° F. to 210° F. Stream 30 is now compressed in vapor compressor 31, so as to provide process steam at a usable temperature level. The balance of condensate stream 27 may also be passed to compressor 31 via 32, and may be combined with stream 30 so as to de-superheat the steam during compression. The resulting compressed and de-superheated steam is withdrawn from unit 31 via 33, at a temperature typically in the range of 200° F. to 250° F., and is preferably passed to usage in unit 7 as heating steam, being directly injected into unit 7 as heating steam. A portion of stream 33 may alternatively be employed in reboiler 9 for heating purposes. Stream 33 is usually combined with reboiler vapor stream 34, and the combined vapor stream is passed via 35 into unit 7.

Numerous alternatives may be practiced within the scope of the present invention. Thus, in its broadest embodiment the present invention may omit many of the process steps described supra. In this case, the invention may be viewed as involving the concept of partial condensation of the mixed gas stream derived from a regenerator, with concomitant vaporization of a heat exchange fluid which is subsequently compressed to provide vapor at a usable temperature level. Thus, recirculation of steam condensate may be omitted from the inventive concept in its broadest scope, since other heat exchange fluids such as ammonia or Dowtherm may be employed. The compressed vapor stream may be employed for heating in the regenerator, or alternatively this stream may be passed to other process heating usages. Other modifications within the scope of the present invention will occur to those skilled in the art.

It will be understood that the method of the present invention is applicable with other alkaline absorbent solutions besides MEA. Thus, potassium carbonate solution could be employed as the scrubbing solution. In this case, since the vapor pressure of potassium carbonate is negligible under conventional operating conditions, section 13 and is function may be omitted. Blowdown stream 29 would also not be required.

It should also be noted that the method of the present invention may be carried out by the use of other equipment besides that described supra. Thus, a steam jet may be used instead of a mechanical device, to compress the vapors leaving the partial condenser. In addition, a packed section may be used to effect the partial condensation, rather than an indirect heat exchanger. In this case the hot water would be sent to a separate flash drum, so that water vapors substantially free of acid gas would be obtained. As mentioned supra, some heat transfer material other than water, such as ammonia or Dowtherm, may be used on the vaporizing side of the partial condenser. In this situation the vaporized fluid would not be introduced directly into the regenerator but instead would be used indirectly to heat the solution to be regenerated. The condensate stream 28 may be preheated by heat exchange with other process fluids, prior to passing into unit 16 for vaporization. Finally, the choice of evaporating and condensing pressures and temperatures, and degree of compression, will vary from system to system. It will be dependent upon the properties of the fluids and the cost of energies at a specific location.

An example of a typical industrial application of the method of the present invention will now be described.

*Example*

A synthesis gas stream containing carbon dioxide is scrubbed by an aqueous MEA solution. The scrub solution, laden with absorbed carbon dioxide, is regenerated by steam heating in a regeneration tower. Vapors rising towards the top of the tower consist of a mixture of 41,300 lbs./hour of water, 37,000 lbs./hour of carbon dioxide and 375 lbs./hour of MEA. This gaseous mixture passes through two bubble cap trays at the top of the tower where it is scrubbed with 19,200 lbs./hour of water containing 54 lbs./hour of MEA. This scrub solution absorbs 320 lbs./hour of MEA, and in addition 200 lbs./hour of water is condensed. Thus, the gaseous mixture leaving the top of the regenerator tower consists of 41,100 lbs./hour of water vapor, 37,000 lbs./hour of carbon dioxide and 55 lbs./hour of MEA. This gas mixture is at a temperature of 217.5° F. and a pressure of 22.7 p.s.i.a.

Passing through the partial condenser, the gas mixture is cooled to 206° F., thereby condensing 18,200 lbs./hours of water and 49 lbs./hour of MEA. The total heat released by this condensation is 18,300,000 B.t.u./hour. The non-condensed gases are further cooled in a final condenser in which 22,000 lbs./hour of water is condensed. This condensate contains 6 lbs./hour of MEA and 30 lbs./hour of carbon dioxide. Following this cooling step th cearbon dioxide and uncondensed water vapor are vented to the atmosphere.

Of the liquid condensed in the final condenser, 19,400 lbs./hour of water is heated from 100° F. to 202° F., utilizing a plant waste heat stream, and introduced into the evaporative side of the partial condenser. About 18,400 lbs./hour of this condensate is vaporized, at 202° F. and 12 p.s.i.a. The vapor is then compressed to 26.7 p.s.i.a and introduced into the bottom of the regeneration tower.

Approximately 900 lbs/hour of condensate leaving the final condenser is introduced into the steam compressor to reduce the superheat generated by the compression. The remaining condensate leaving the final condenser is pumped back to the circulating MEA stream.

The concentration of MEA on the evaporative side of the partial condenser is not permitted to exceed 0.5%. To maintain this concentration, 1000 lbs./hour of boiling solution is continually blown down. This solution, plus the 18,200 lbs./hour of water condensed in the partial condenser, is pumped back to the top of the regeneration tower where it serves as the scrubbing solution to strip MEA from the rising vapors.

What I claim is:

1. In the process of removing weakly acidic gases from gas streams by scrubbing with an aqueous alkaline scrub solution, followed by regeneration of the scrub solution by heating in a stripping tower whereby a mixed vapor stream containing desorbed acid gas and steam is produced, the improved method of recovering heat from said mixed vapor stream which comprises cooling said mixed vapor stream by a first indirect heat exchange, whereby a portion of said steam component is condensed to form a first condensate stream, recycling said first condensate stream to said regeneration step in the upper part of said stripping tower, further cooling said mixed vapor stream by a second heat exchange, whereby another portion of said steam component is condensed to form a second condensate stream, dividing said second condensate stream into a first portion and a second portion, vaporizing said first portion of said second condensate stream by said first indirect heat exchange, compressing said vaporized portion to provide compressed steam at a more highly elevated temperature, recycling said second portion of said second condensate stream to said compression step and combining said second portion with said compressed steam, whereby said compressed steam is desuperheated, and recycling said compressed steam as heating steam in said regeneration.

2. In the process of removing weakly acidic gases from gas streams by scrubbing with aqueous monoethanolamine absorbent solution, followed by regeneration of the solution by heating in a stripping tower whereby a mixed vapor stream containing desorbed acid gas, steam and monoethanolamine is produced, the improved method of recovering heat from said mixed vapor stream which comprises cooling said mixed vapor stream by a first indirect heat exchange, whereby portions of said steam and monoethanolamine components are condensed to form a first condensate stream, recycling said first condensate stream to said regeneration step in the upper part of said stripping tower, further cooling said mixed vapor stream by a second heat exchcange, whereby a second condensate stream is formed, dividing said second condensate stream into a first portion and a second portion, partially vaporizing said first portion of said second condensate stream by said first indirect heat exchange, compressing the vaporized portion of said first condensate portion to provide compressed steam at a more highly elevated temperature, recycling said second portion of said second condensate stream to said compression step and combining said second portion with said compressed steam, whereby said compressed steam is desuperheated, recycling said compressed steam as heating steam in said regeneration, and combining the unvaporized portion of said second condensate stream remaining from said first heat exchange with said first condensate stream prior to said recycle of said first condensate stream.

3. In the process of removing weakly acidic gases from gas streams by scrubbing with aqueous monethanolamine absorbent solution at a temperature in the range of 80° F. to 130° F., followed by regeneration of the solution by heating in a striping tower to a temperature in the range of 200° F. to 250° F. whereby a mixed vapor stream containing desorbed acid gas, steam and monethanolamine is produced, the improved method of recovering heat from said mixed vapor stream which comprises cooling said mixed vapor stream to a temperature in the range of 200° F. to 210° F. by a first indirect heat exchange, whereby portions of said steam and monoethanolamine components are condensed to form a first condensate stream, recycling said first condensate stream to said regeneration step in the upper part of said stripping tower, further cooling said mixed vapor stream to a temperature in the range of 80° F. to 120° F. by a second heat exchange, whereby a second condensate stream is formed, dividing said second condensate stream into a first portion and a second portion, partially vaporizing said first portion of said scond condensate stream at a temperature in the range of 195° F. to 210° F. by said first indirect heat exchange, compressing the vaporized portion of said first condensate portion to provide superheated compressed steam at a more highly elevated temperature, recycling said second portion of said second condensate stream to said compression step and combining said second portion with said compressed steam, whereby said compressed steam is desuperheated to a temperature in the range of 200° F. to 250° F., recycling said compressed steam as heating steam in said regeneration, and combining the unvaporized first portion of said second condensate stream with said first condensate stream prior to said recycle of said first condensate stream.

References Cited by the Examiner

UNITED STATES PATENTS

| 2,368,600 | 1/1945 | Rosenstein | 23—3 |
| 2,886,405 | 5/1959 | Benson | 23—3 |
| 3,101,996 | 8/1963 | Bresler et al. | 23—2 |

FOREIGN PATENTS 849,150   9/1960   Great Britain.

OSCAR R. VERTIZ, *Primary Examiner.*

MAURICE A. BRINDISI, *Examiner.*

E. C. THOMAS, *Assistant Examiner.*